Nov. 12, 1957 — E. L. HOEFLICH — 2,813,188
ELECTRIC HEATING UNIT FOR COOKING RANGES
Filed May 17, 1954 — 2 Sheets-Sheet 1
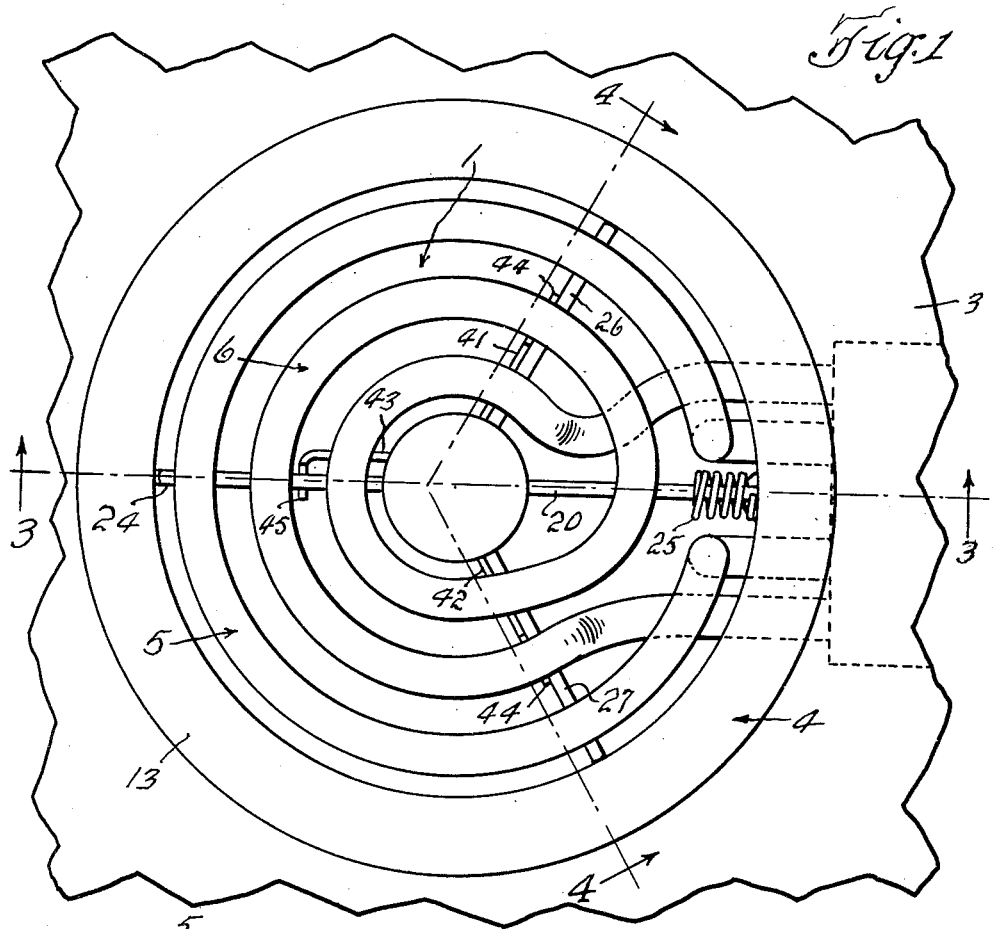
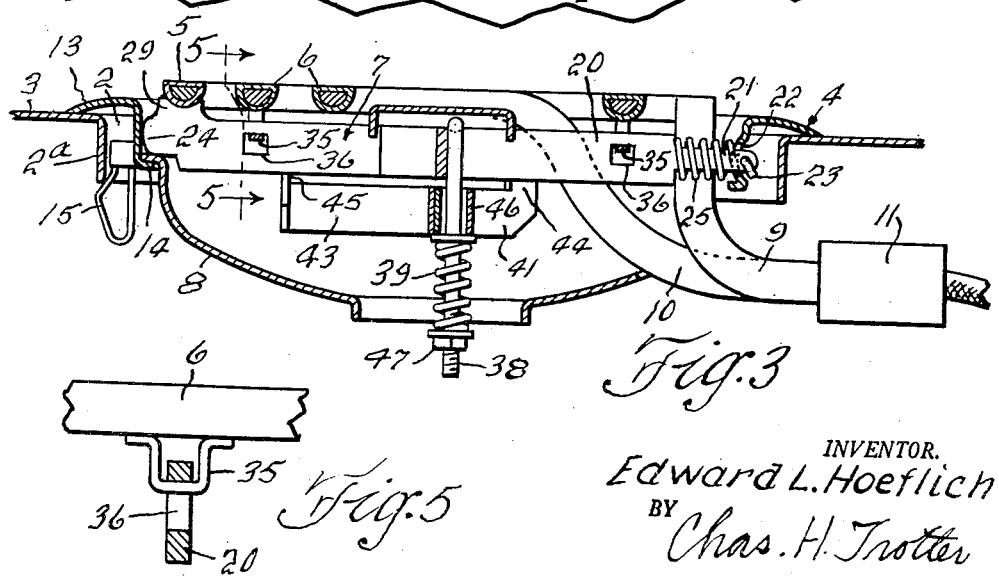
INVENTOR.
Edward L. Hoeflich
BY Chas. H. Trotter
Atty.

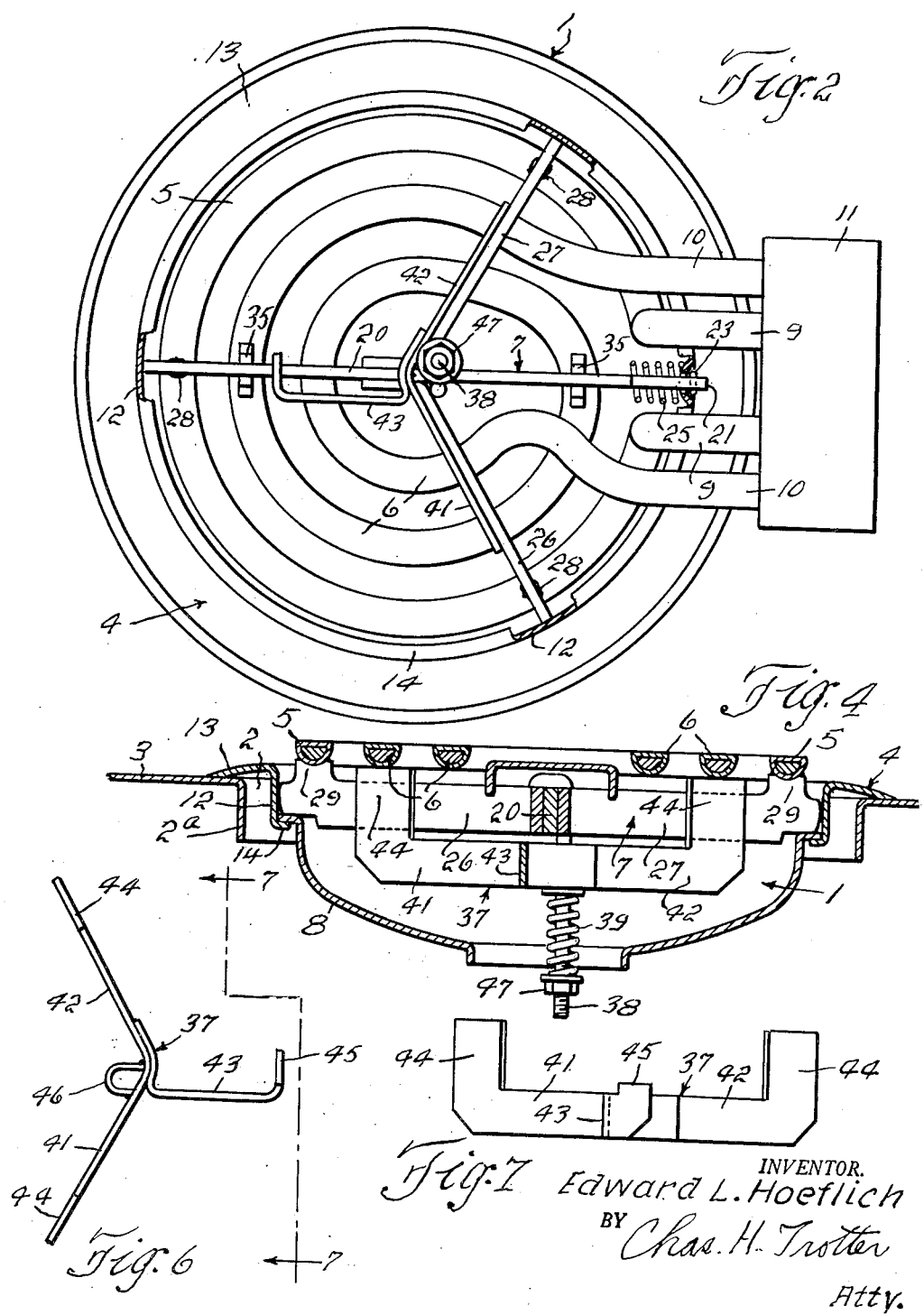

United States Patent Office 2,813,188
Patented Nov. 12, 1957

2,813,188
ELECTRIC HEATING UNIT FOR COOKING RANGES

Edward L. Hoeflich, Bellville, Ohio, assignor to The Tappan Stove Company, Mansfield, Ohio, a corporation of Ohio Application May 17, 1954, Serial No. 430,133

4 Claims. (Cl. 219—37)

This invention relates generally to electric heating units for cooking ranges. More specifically the invention relates to heating units having inner and outer heating elements, and which are adapted to be mounted in the top of a cooking range in position for a cooking utensil to be placed thereon.

Heating units of this general type usually comprise two independent concentrically arranged heating elements with the top surface thereof permanently disposed in the same plane. The two elements are carried by a frame which is adapted to be removably secured in an aperture in the top wall of a cooking range. The energization of the elements is controlled by a suitable switch through which each element may be energized singly or both elements may be energized in unison with each other, either at 240 volts or 120 volts. The two elements are so proportioned with respect to each other that the inner element is of higher wattage than the outer element. The unit will produce the highest heat when both elements are simultaneously energized in parallel at 240 volts; the next highest heat when the inner element alone is energized at 240 volts, and the third highest heat when the outer element alone is energized at 240 volts. When the elements are energized at 120 volts they will each produce one-fourth the amount of heat they produce when energized at 240 volts. The most efficient and economical method of cooking on heating units of this type is to energize both elements in unison until food to be cooked is brought up to cooking temperature, and then cut out one or the other of the elements depending on particular conditions.

Prior to my invention the top surface of the two elements, upon which cooking utensils are supported, were permanently secured in the same horizontal plane. In order to obtain the best transfer of heat between a heating unit and to minimize deterioration of the heating elements, it is essential that the top surfaces of the heating elements be in contact with the bottom of a utensil thereon. As long as the bottom of a utensil is perfectly flat it will contact both elements satisfactorily, but the bottoms of most cooking utensils become slightly convex after a relatively short time as compared to the normal life of a utensil. Thereafter when used the bottom of the utensil will contact the inner element and be slightly spaced from the outer element. This will result in a poor transfer of heat between the outer element and the utensil and will cause the outer element to deteriorate much faster.

In accordance with my invention I mount the outer element in fixed position and I resiliently mount the inner element for vertical and rocking movement within the outer element. The inner element is normally resiliently held in position with the upper surface thereof in the plane of the upper surface of the outer element. With this arrangement a utensil having a slightly convex bottom will rest on the outer element and depress the inner element which will accommodate itself to the bottom of the utensil and be resiliently held thereagainst. The construction is such that various utensils having bottoms with different degrees of convexity may be used and a firm contact of both elements with the bottoms of the utensils will always be maintained during use.

The principal object of the invention is to provide an electric heating unit for a cooking range or the like, having inner and outer concentric heating element which are so constructed and arranged that they will readily accommodate themselves to the convex bottoms of cooking utensils and be firmly held in contact therewith during use.

Another object of the invention is to provide an electric heating unit of the aforesaid character which is of simple construction, is inexpensive to manufacture and is very efficient in operation.

Other and more limited objects of the invention will be apparent from the following specification and the accompanying drawings forming a part thereof wherein:

Fig. 1 is a top plan view of a heating unit constructed according to my invention, and showing it mounted in the top of a cooking range;

Fig. 2 is a bottom plan view of the unit showing the unit removed from the range and the dip pan removed from the unit;

Fig. 3 is a vertical section taken substantially on the line 3—3 of Fig. 1;

Fig. 4 is a vertical section taken substantially on the line 4—4 of Fig. 1;

Fig. 5 is an enlarged vertical detail section taken substantially on the line 5—5 of Fig. 3;

Fig. 6 is a plan view of the spider through which the inner heating element is biased to initial position, and Fig. 7 is a view in elevation of the spider as viewed from the line 7—7 of Fig. 6.

Referring now to the drawing by reference characters, the numeral 1 indicates generally an electric heating unit embodying my invention. The unit 1 is adapted to be removably mounted in an aperture 2 defined by an annular flange 2a which extends downwardly from the underside of a stove top 3, and comprises a frame 4, outer and inner heating elements 5 and 6 respectively and element supporting means 7 which is removably mounted in the frame 4. A heat reflecting and drip pan 8 is also removably mounted in the frame 4 under the heating elements 5 and 6 and the supporting means 7.

The heating elements 5 and 6 are of the type in which an electric resistance coiled wire is embedded in suitable insulating material within a metal sheath. They are of standard construction and are manufactured by various different companies. They are generally ring-shaped and as shown herein the outer element 5 consists of a single convolution and the inner element 6 consists of two convolutions. The ends 9 and 10 of the elements 5 and 6 respectively extend downwardly and outwardly from the elements 5 and 6 and into a terminal block 11 in which they are loosely mounted.

The frame 4 comprises a vertical cylindrical wall 12 having an outwardly extending flange 13 at the upper end thereof which is adapted to seat on the top 3 of the range around the aperture 2, and an inwardly extending flange 14 at the lower end thereof which supports the pan 8 and element supporting means 7. The frame 4 is yieldably held in place within the aperture 2 by a plurality of spaced spring clips 15 which are secured to the outer face of the wall 12.

The element supporting means 7 comprises an elongated rectangular bar 20 having a reduced end 21 which extends out through a slot 22 in the frame wall 12 and is retained therein by a stop ring 23 carried by the reduced end 21 of the bar at the outer end thereof. The opposite end 24 of the bar 20 is supported by the flange 14 and is yieldingly held in contact with the wall 12 by a spring 25 disposed about the reduced end 21 of the bar. A pair of angularly disposed legs 26 and 27 are welded to opposite sides of the bar 20 and extend outwardly therefrom into engagement with the wall 12, with the free ends thereof being likewise supported by the flange 14. The outer heating element 5 is permanently secured as by welding indicated by 28, to the tops of bosses 29 which are carried by and extend upwardly from the bar 20 and legs 26 and 27.

The heating unit 1 as thus far described is of standard construction which is extensively used by various manufacturers of electric ranges. My invention, which relates to the means for mounting the inner heating element 6 for vertical and rocking movement with respect to the outer heating element 5 and for yieldingly biasing it to initial position with the top surface thereof disposed substantially in the plane of the outer heating element, will now be described.

The inner element 6 is mounted concentrically with the outer element 5, and is connected to the element supporting means 7 by a pair of diametrically spaced bails 35 which are welded to the under side of the element 6 and extend downwardly therefrom and through vertically elongated slots 36 in the bar 20, as most clearly shown in Fig. 5. The bails 35 and slots 36 are so proportioned with respect to each other that the element 6 is free to rock or tilt in any radial direction and to be moved vertically up and down. The downward movement of the element 6 is limited to the engagement thereof with the top of the supporting means 7, and the upward movement of the element 6 is limited to the bails 35 engaging the tops of the slots 36. The element 6 is yieldingly biased to initial position, with the top surface thereof disposed in the plane of the top surface of the outer element 5, by a spider 37 which is slidably mounted below the supporting means 7 upon a post 38, carried by and extending downwardly from the bar 20, and is urged upwardly by a coiled spring 39 disposed about the post 38 below the spider 37. The spider 37 comprises three outwardly extending angularly disposed legs 41, 42 and 43 all secured rigidly together. The legs 41 and 42 are similar to each other and the outer ends thereof terminate in elongated upward extensions 44 which are adapted to engage the under side of the outer convolution of the inner element 6, as is most clearly shown in Fig. 4. The leg 43 is shorter than the legs 41 and 42 with outer end thereof disposed at right angles thereto and having a short upward extension 45 which is adapted to engage the bottom of the bar 20 as shown in Fig. 3. The spider 37 has a loop 46 rigidly secured thereto through which the post 38 extends. The loop is slightly larger than the diameter of the post 38, as shown in Fig. 3, in order to permit the spider 37 to have a slight rocking or tilting movement with respect to the post 38. In position the spider 37 is disposed under the supporting means 7 in spaced relation thereto with the legs 41 and 42 parallel with the legs 26 and 27 respectively and the sides of the extensions 44 in engagement with the sides of the legs 26 and 27. A nut 47 on the threaded lower end of the post 38 is provided to adjust the tension of the spring 39.

In use when a utensil having a diameter greater than the diameter of the outer element 5 and having a slightly convex or dished bottom is placed upon the unit 1 it will depress the inner element 6 until the utensil is seated on the outer element 5, after which the inner element 6 will accommodate itself to the bottom of the utensil. If a utensil having a diameter less than the inside diameter of the outer element 5 is placed upon the unit 1 it will depress the inner element 6 until it seats firmly on the supporting means 7.

From the foregoing it will be apparent that I have provided a very simple, inexpensive and efficient means for accomplishing the objects of the invention.

It is to be understood that I am not limited to the specific construction shown and described herein as various modifications may be made therein within the scope of the appended claims.

What is claimed is:

1. An electric heating unit of the character described comprising inner and outer concentrically arranged heating elements, mounting means by which said outer heating element is mounted in fixed position with the upper surface thereof disposed in a horizontal plane, supporting means by which said inner heating element is supported for vertical and rocking movement with respect to said outer heating element, said inner element supporting means comprising a post carried by and extending downwardly from said mounting means axially of the unit, a spider having a plurality of spaced radially extending legs loosely mounted in said post with one of said legs bearing against the underside of said mounting means and the other of said legs bearing against the underside of said inner heating element, means loosely interengaging the inner heating element and said mounting means for limited vertical and rocking movement of the former relative to the latter, and a spring carried by said post below said spider in position to maintain said legs in contact with said mounting means and said inner heating element, said spider and spring being operative yieldingly to bias said inner heating element upwardly to initial position.

2. An electric heating unit as set forth in claim 1 characterized further by the provision of adjusting means operative to vary the force exerted by said spring and hence the bias of said inner heating element.

3. An electric heating unit of the character described comprising a frame adapted to be removably mounted in an aperture in a range top, mounting means having a plurality of radial legs disposed within said frame with the end of at least one such leg pivotally connected to the frame, an outer heating element rigidly secured to said mounting means with the upper surface thereof disposed in a horizontal plane, a concentrically arranged inner heating element, and supporting means by which said inner heating element is supported for vertical and rocking movement with respect to said outer heating element, said supporting means comprising a post carried by and extending downwardly from said mounting means axially of the unit, a spider having a plurality of spaced radially extending legs slidably and loosely mounted on said post with one of said legs bearing against the underside of said mounting means and the other of said legs bearing against the underside of said inner heating element, means loosely inter-engaging the inner heating element and said mounting means for limited vertical and rocking movement of the former relative to the latter, and a spring carried by said post below said spider maintaining said legs in contact with said supporting means and inner heating element, said spider and spring being operative yieldingly to bias said inner heating element upwardly to initial position.

4. A heating unit as set forth in claim 3 characterized further by the provision of adjusting means operative to vary the force exerted by said spring and hence the bias of said inner heating element.

References Cited in the file of this patent
UNITED STATES PATENTS

| | | |
|---|---|---|
| 2,260,108 | Wiegand et al. | Oct. 21, 1941 |
| 2,270,293 | Grunder | Jan. 20, 1942 |
| 2,288,967 | Challet | July 7, 1942 |
| 2,689,903 | Radley | Sept. 21, 1954 |